(12) United States Patent  
Nakamura (10) Patent No.: US 6,239,922 B1
(45) Date of Patent: May 29, 2001

(54) OBJECTIVE LENS

(75) Inventor: Shinichi Nakamura, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/345,391

(22) Filed: Jul. 1, 1999

(30) Foreign Application Priority Data

Jul. 3, 1998 (JP) ................................. 10-202888

(51) Int. Cl.[7] .............. G02B 9/00; G02B 3/00; G02B 7/02
(52) U.S. Cl. .............. 359/739; 359/740; 359/64 R; 359/822
(58) Field of Search ................... 359/739, 740, 359/741, 822, 642, 742, 743

(56) References Cited

U.S. PATENT DOCUMENTS

| 5,589,989 | 12/1996 | Estelle et al. ............ 359/785 |
| 5,675,445 | * 10/1997 | Uemara ................ 359/827 |
| 5,801,889 | * 9/1998 | Meyers ................. 359/743 |

FOREIGN PATENT DOCUMENTS

| 7-84179 | 3/1995 | (JP) . |
| 9-68647 | 3/1997 | (JP) . |

* cited by examiner

Primary Examiner—Georgia Epps
Assistant Examiner—Michael A Lucas
(74) Attorney, Agent, or Firm—Arnold International; Bruce Y. Arnold (57) ABSTRACT

In an image-forming lens, an inclined slope or section is provided at a marginal annular region on a surface of an optical member and a light shield is provided on this inclined slope or section. The optical member is mounted longitudinally so that the inclined slope or section is located near where off-field fight (i.e, fight from outside the designed field of view of the lens) reflects off an inner surface of a holding member or at the periphery of an optical member. Thus, the inclined slope or section with light shield acts to shield the reflected off-field light from passing to the image. The invention finds particular advantage in very small lenses that include optical members less than 3 mm in diameter.

22 Claims, 7 Drawing Sheets

OBJECTIVE LENS

BACKGROUND OF THE INVENTION

An endoscope is inserted into narrow spaces such as human internal body parts or the interior of an engine. Therefore it is desirable that the outer diameter of an endoscope be as small as possible, and this requires that the diameter of the lens that is arranged at the tip of an endoscope be as small as possible. An example of a lens of an endoscope that has a comparatively small diameter and wherein the lens is made using only a few lens elements is described in Japanese Laid-Open Patent Applications H9-68647 and H7-84179.

Figure 9:
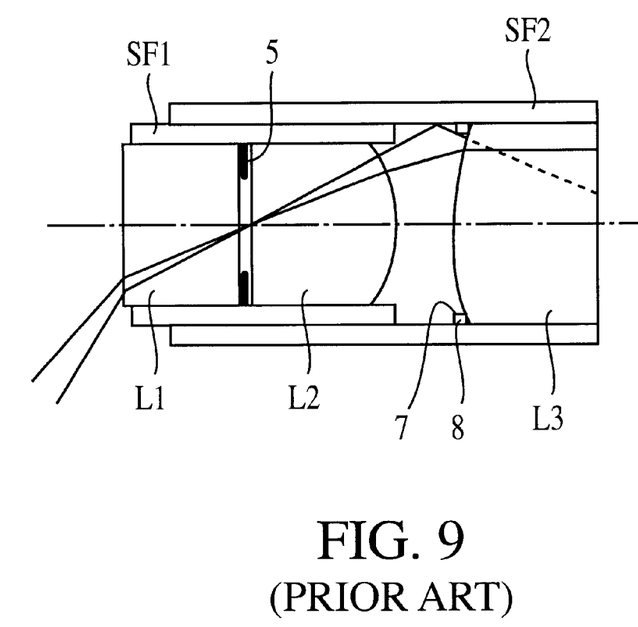
FIG. 9 is a sectional view of a conventional lens.

FIG. 9 illustrates the same objective lens element structure as that of Example 1 of Japanese Laid-Open Patent Application H9-68647, but includes different labels and, in addition to showing the objective lens elements themselves, FIG. 9 also illustrates conjectured support structure and flare-reducing structure for these lens elements. The lens comprises, in order from the object side, a first lens element lens L1, an aperture stop 5 (ie., a brightness diaphragm), a second lens element L2 of positive refractive power and a third lens element L3 of positive refractive power. In one embodiment of Japanese Laid-Open Patent Application H9-68647, lens element L1, which in all other embodiments is piano-concave, is replaced by a plane-parallel cover plate. Although no support structure whatsoever for these lens elements is actually shown in Japanese Laid-Open Patent Application H9-68647, FIG. 9 illustrates the assumed support structure for these components based on standard practices in the art, as will now be discussed. Because the first lens element L1 (or cover plate, as the case may be) and the second lens element L2 have the same outer diameter, they have been illustrated in FIG. 9 as being fixed to a first support frame SF1. An aperture stop 5 lies between the first lens element L1 and the second lens element L2. Thus, the first support frame SF1, is shown supporting these three elements. Further, it is likely that the outer diameter of the first support frame SF1 would be sized to equal the outer diameter of the third lens element L3, which in Japanese Laid-Open Patent Application H9-68647 is shown as having an outer diameter that is slightly larger than the outer diameter of the other two lens elements. Having their outer diameters equal would enable the first support frame SF1 and the second lens element L2 to each be inserted into a second support frame SF2, as illustrated in FIG. 9. Adjacent lens element L3 in FIG. 9 is illustrated a conjectured flare diaphragm 7 and a diaphragm receiving member 8, as would commonly be used in the prior art to form a flare stop.

Figure 10:
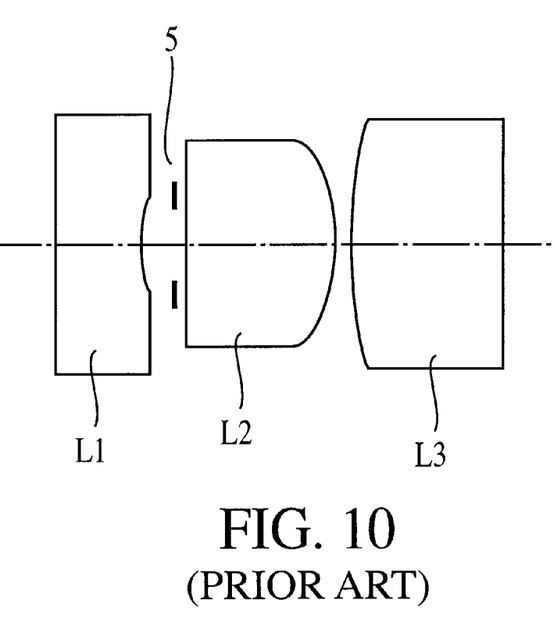
FIG. 10 is a sectional drawing of another conventional lens, less the support structure for the optical elements.

FIG. 10 illustrates the lens element structure of Example 6 of Japanese Laid Open Patent Application H7-84179. The lens of this example includes, in order from the object side, a plano-concave lens L1, an aperture stop 5, a positive meniscus lens element L2, and a positive lens element L3.

In image formation lenses generally, in order to remove the light which does not contribute to image formation, a flare stop is often provided. There is no known description in the above-mentioned two patents which relates to a flare stop. However, as shown in prior art FIG. 9 for optical diaphragms generally, a flare diaphragm 7 and a diaphragm receiving member 8 are often provided on the object side of lens element L3. In many cases, such a flare stop is provided at this position in order to prevent stray light that has been reflected off the inner surface of the frame from passing through to the observer. The flare stop is positioned before lens element L3 because stray light rays (i.e., those from a larger angle of view than for which the lens was designed to image) in many cases are incident on the frame between positive lens elements L2 and L3.

However, if the outer diameter of a lens element is made smaller to achieve size reduction, the associated diaphragm receiving member and flare stop member must also be made smaller. Because these members are each shaped as an annular ring which circumscribes an aperture having a diameter that is nearly the same diameter as the lens element itself, as the lens element becomes smaller, the width of the annular ring becomes so small that manufacture and assembly of the ring become difficult.

Although it is known to bevel the edge of a lens element so as to form a sloped surface near the circumference of the lens element and to use this surface to self-center a lens element in lieu of using a spacer ring (as taught, for example, in U.S. Pat. No. 5,589,989) there is no teaching in this reference or any other reference known to applicant which suggests beveling an edge of a lens element and applying a light shielding material (i.e., one which absorbs or attenuates light) to a sloped surface created by the beveling process in order to reduce flare. Nor is there any suggestion that such an approach to reducing flare will result in fewer components and result in an overall cost reduction for assembling a lens system having small diameter components.

BRIEF SUMMARY OF THE INVENTION

The present invention forms an inclined or sloped surface on an optical member (such as a lens element, plane-parallel plate of a filter or cover glass, etc.), near the outer diameter of the optical member and applies a light shielding substance to the sloped surface in order to achieve flare reduction. The sloped or inclined surface, which may be the lens element surface itself, is immediately adjacent a circumferential edge of the optical element, and the circumferential edge is supported by a holding member. Alternatively, the present invention omits forming a separate, planar, sloped surface for the light shield, and instead designs the optical member so a light shielding substance may be easily applied to a sloped surface of a convex lens element near its periphery in order to shield flare from reaching the image. Flare, as used herein, refers to unwanted light which enters an optical system outside the intended field of view and is reflected toward the image plane by one or more surfaces of the optical system. A first object of the invention is to avoid using an annular ring for flare reduction in the case where the diameter of the optical member is small A second object of the invention is to enable the overall manufacturing and assembly cost of an optical system to be reduced by achieving the first object of the invention, while still maintaining adequate flare reduction. Thus, the present invention relates particularly to very small optical members, such as lens elements, filters or cover plates as may be found in endoscopes, or in other applications (e.g., in small electronic cameras, small cameras for monitoring, etc.) where size reduction causes the prior art structures and methods for flare reduction (discussed above) to become unsatisfactory.

BRIEF DESCRIPTION OF THE DRAWINGS

The present invention will become more fully understood from the detailed description given below and the accompanying drawings, which are given by way of illustration only and thus are not limitative ofthe present invention, wherein:

FIG. 1(*a*) is a side, sectional view of a first embodiment of the invention,

DETAILED DESCRIPTION

As used herein, the term "optical member" refers to either a single lens element, two lens elements that are cemented together, a plane-parallel plate such as a filter or cover glass, or any combinations of these elements. The present invention relates particularly to optical systems having small diameter optical members. However, the invention may also find utility in other optical systems as well. In optical systems having small diameter optical members, the invention enables such systems to be made and assembled less expensively than previously possible while retaining the same capability of preventing unwanted light from outside the design field of view of the lens from reaching the image plane. Such light is termed flare and, if not shielded, may reach the image surface as a result of undesired reflections of off-axis rays within the lens and cause artifacts in the image.

In the present invention, it is preferable if the following Conditions (1) and (2), below, are satisfied.

$\Phi 1 < 3$ mm  Condition (1)

$0.6 < \Phi 2/\Phi 1 < 0.95$  Condition (2)

where $\Phi 1$ is the outer diameter of an optical member $\Phi 2$ is the maximum clear aperture diameter of the optical member (excluding a peripheral region, to which is applied a light shielding substance).

If the upper limit value of 0.95 of Condition (2) is exceeded, there will be too little width to adequately shield the rays that cause flare at the image plane. In other words, the slope becomes smaller, and the effect of flare reduction decreases. Moreover, if the lower limit value (0.6) of Condition (2) is not satisfied, the outer diameter for the portion of the optical member other than the slope will become large. Thus, although flare reduction will be obtained, light throughput of the optical member will become small and the image brightness will decrease.

Moreover, it is better if either of the stricter conditions (3) or (4) is satisfied by at least one of the optical members in the lens of the invention.

$\Phi 1 < 2$ mm  Condition (3)

$0.6 < \Phi 2/\Phi 1 < 0.85$  Condition (4)

In other words, instead of merely satisfying Conditions (1) and (2), it is better if one of the stronger Conditions (3) and (4) is also satisfied by at least one of the optical members in the lens of the invention. Further, it is best if both of the stronger Conditions (3) and (4) are satisfied by at least one of the optical members in the lens of the invention.

A lens according to the invention includes, in order from the object side, an aperture stop, a positive lens element having a convex surface on the image side, and a positive lens element having a convex surface on the object side. Further, the positive lens element with the convex surface on the object side is held by a holding member, a region of the convex surface near the edge of this positive lens has a slope, the slope has a light attenuating or light absorbing material thereon which reduces flare by the slope being near the region (and thus in the path) where a light ray from outside the visual field reflects at the interior of the holding member and is incident on the convex surface side of a positive lens element.

The lens of this invention includes a lens element, plane-parallel plate (such as a filter or cover glass) or other optical member. A slope is provided on the circumference edge of at least one optical member. A fight shield is provided on the slope, and the following condition is satisfied.

$0.5 < D/f < 2$  Condition (5)

where

D is the air path equivalent length (i.e., the sum of the values d/n) from the on-axis position of the surface of the optical member having the slope formed thereon to an image surface, and f is the focal length of the lens.

Condition (5) defines the distance from the on-axis position of the surface which includes the slope to the image surface. In other words Condition (5) defines an effective axial position for the slope which removes flare, which also corresponds to the axial position at which flare tends to be generated by light being reflected off a framework surface.

In the objective optical system of the above-mentioned type with two convex surfaces, the principal ray has a tendency to become farther removed from the optical axis as it progresses past the aperture stop. For this reason, since the image surface tends to be close to the aperture stop at the position where the upper limit of Condition (5) is exceeded, the light ray height is low. Removal of flare light, on the other hand, is best achieved where the ray height is high, i.e., where it is so high that it reflects from the frame. For this reason, axial positions near an aperture stop are not suitable as a position for providing a flare stop.

On the other hand, if the lower limit of Condition (5) is exceeded, the flare stop must be too near the image surface, making it impossible to remove flare that is generated before the slope. Moreover, there is a possibility that the image-formation beam for which the height of the light-rays becomes high may be scattered.

The lens of this invention relates particularly to optical members which are inserted and held inside a holding member. A slope is formed on an annular surface of an optical member in a section adjacent to the edge of the optical surface that is held by the holding member. Usually, the optical member selected for having the flare-reducing slope is the one nearest the image side of the holding member. In the case where a lens has several optical members and holding members, and the optical members are held by different holding members, at least one of the optical members held by the holding member which is nearest the image side should have a flare-reducing slope (either a planar or convex slope) provided.

An important characteristic of the present invention is that a flare stop that is an integral part of the optical member is provided. A conventional flare stop is in many cases inserted and held between optical members. Many optical members, such as a lens element provided at the end of a support frame of a lens, do not have another optical member attached in the same support frame (on one side). Thus, using a conventional flare stop becomes difficult, since there are not the necessary optical components within which the flare stop may be inserted. For this reason, when flare removal is necessary at such a position, it is preferable to employ the slope structure of the present invention for flare reduction.

Furthermore, in forming a light shielding means using adhesives while fixing a lens element to a frame, a specially formed (i.e., planar) slope for supporting the light absorbing or light attenuating adhesive material to shield against flare is not required, provided the following Condition (6) is satisfied:

$$\Phi 1/(2\times |R|) > 0.34 \qquad \text{Condition (6)}$$

where $\Phi 1$ and $R$ are as defined above.

Figure 8A:
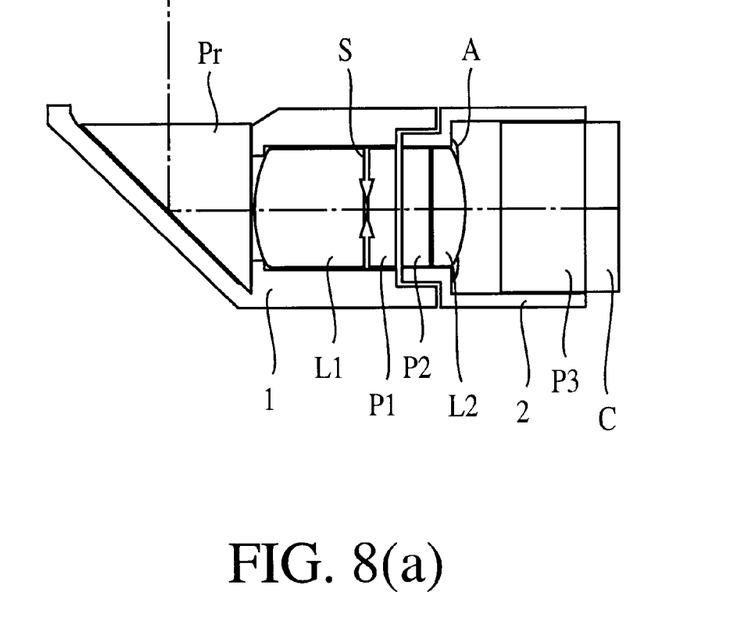
FIG. 8(a) is a sectional view of an eighth embodiment of the invention.
Figure 8B:
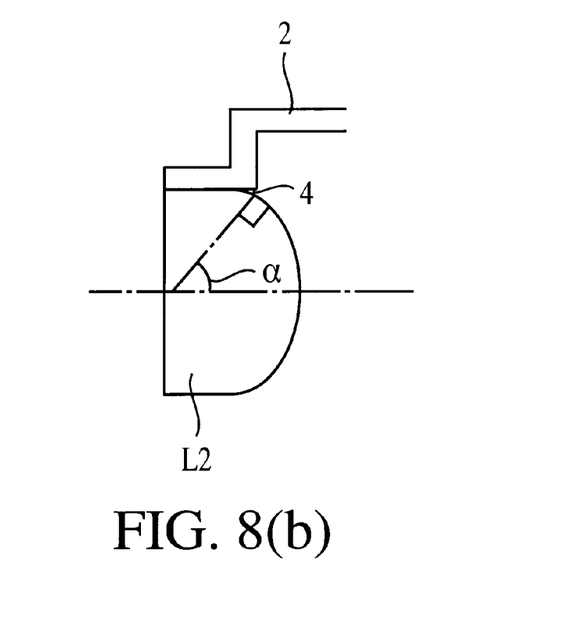
FIG. 8(b) is an expanded view of the lens element L2 shown in FIG. 8(a)

Condition (6) provides that the angle between a normal to the lens element surface at the periphery of the lens and the optical axis is greater than 20°, thereby ensuring that a groove 4, as illustrated in FIG. 8(b), is formed at the periphery of the lens element in which a light shielding adhesive may be applied to the sloped, convex surface of a positive lens at the lens periphery for flare reduction.

Several embodiments of the invention will now be described in detail, with reference to the drawings.

Embodiment 1

Figure 1A:
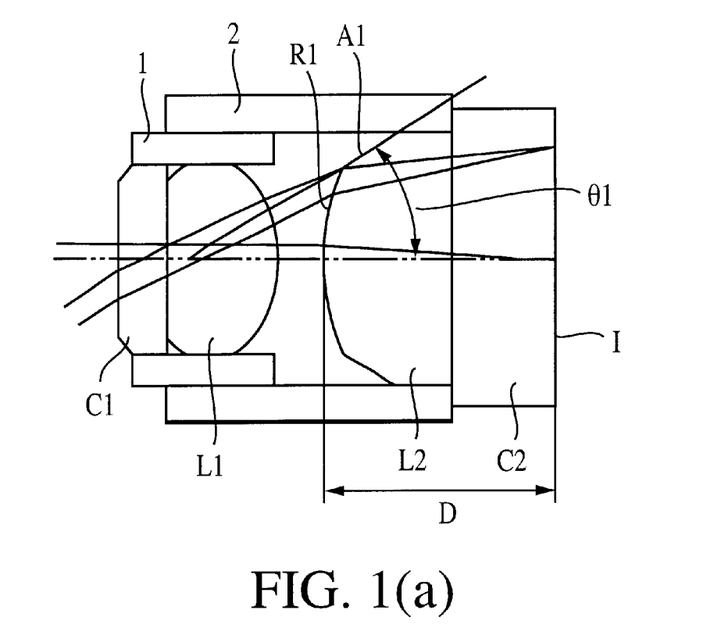

FIG. 1(a) is a side, sectional view of a first embodiment of the invention. The lens of this embodiment includes two lens elements, and is formed of the following components, in order from the object side: a cover glass C1, a film (not visible in this side view), a first lens element L1 of positive power, a second lens element L2 of positive power, and a second cover glass C2. The cover glass C1 has film (not visible in this view) deposited on a portion of its image-side surface, and the film thus serves as an aperture stop. A first lens element L1 is cemented to the film and the remaining portion of the image-side surface of the cover glass C1, and all of these elements are inserted within and held by a first frame 1. The first frame 1 is partially inserted into one end of a second frame 2, and all of these components are fixed by bonding. A second lens element L2 having an outer diameter the same as, or nearly the same as, that of the outer diameter of the first frame 1 is inserted within the other end of the second frame 2 and is fixed by being bonded. Second frame 2 maintains a cover glass C2 of an image pick-up element against its image-side end. Moreover, the image side of the cover glass C2 is at the position of the image plane I, which coincides with the pick-up face of a detector, such as a CCD array.

For the lens of this first embodiment, the circumference edge of the convex surface on the object side of the second positive lens element L2 is made to have a planar slope A1, as illustrated. The slope A1 extends to the side of the lens element and provides an annular cone-like surface. The slope A1 itself provides some assistance in reducing flare by reason of its ability to reflect some of the flare light reflected off the second frame 2 in a direction away from the image. However, in those embodiments of the present invention which use a separately-formed, planar slope to reduce flare, a light shielding material (not visible in this view) is applied to this slope to prevent the passage of light reflected from second frame 2 from progressing to the image plane at I.

Figure 1B:
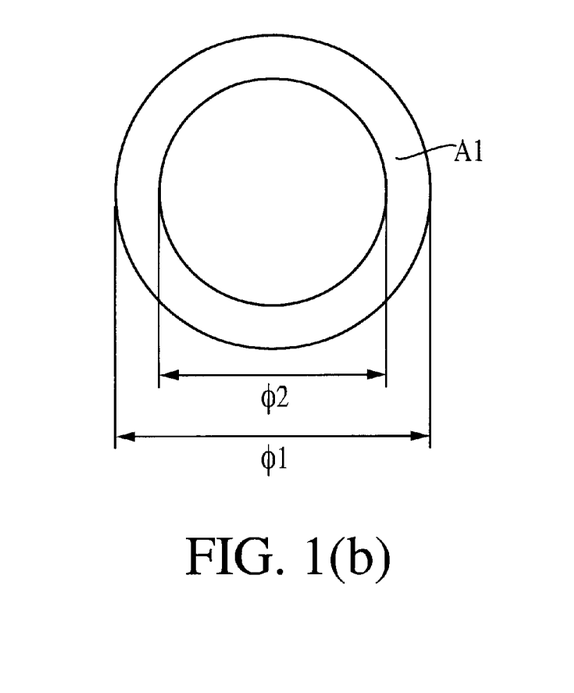
FIG. 1(b) is an end view of the lens element L2 shown in FIG. 1 (a)

FIG. 1(b) is an end view of the lens element L2 shown in FIG. 1(a). The outer diameter of this lens element is $\Phi 1$ and the maximum clear aperture diameter is $\Phi 2$, as illustrated. In this embodiment $\Phi 1$ is 1 mm and $\Phi 2$ is 0.75 mm; thus, the ratio $\Phi 2/\Phi 1$ is 0.75. This embodiment prevents the sloping surface from eclipsing part of the image-forming beam, and thus enables a maximum image height to pass to the image plane unhindered.

Also, the air path equivalent length D from the on-axis position of the object side surface of the second positive lens element L2 to the image plane at I is 0.6 mm. The focal distance of the lens is 0.626 mm. Therefore, the ratio of D/f is 0.96, which satisfies Condition (5).

The slope angle $\theta 1$ (illustrated in FIG. 1(a)) of the second positive lens element L2 is 45 degrees. Moreover, this amount is less than 70 degrees, which is advantageous.

In this embodiment, the second positive lens element L2 is attached to the second frame 2 with a black adhesive. The black adhesive is coated on the periphery surface of the lens (ie., the part supported by the frame) as well as on the slope A1. Thus, the adhesive serves to block light from passing through the lens portion having slope A1. Alternatively, the bonding of the lens elements to the lens frame can use a more common adhesive that is transparent or translucent, and instead of using adhesive on the slope A1, this portion can be coated with black paint to thereby enable the slope A1 to block off-field light that has been reflected by the frame 2 or the periphery surface of a lens element from passing through to the image plane at I.

The lens of this embodiment can be used for an endoscope, an electronic camera, a surveillance camera, etc.

Table 1 lists the surface # in order from the object side, the radius of curvature R (in mm) of each surface, the on-axis surface spacing d (in mm) of each surface, as well as the index of refraction $N_d$ and the Abbe constant $V_d$ (for the d-line) of each optical member of Embodiment 1. In the bottom portion of the table are listed some of the performance values of the lens of this embodiment.

TABLE 1

| # | R | d | $N_d$ | $V_d$ |
|---|---|---|---|---|
| 1 | ∞ | 0.2000 | 1.51633 | 64.15 |
| 2 | ∞ | 0.4500 | 1.51633 | 64.15 |
| 3 | 0.4420 | 0.1600 | | |
| 4 | 0.9770 | 0.5000 | 1.51633 | 64.15 |
| 5 | ∞ | 0.4000 | 1.51633 | 64.15 |
| 6 | ∞ | | | |
| $F_{NO}$ = 5.2 | Image height = 0.45 | f = 0.626 | D = 0.594 | |
| D/f = 0.95 | | | | |

Embodiment 2

Figure 2A:
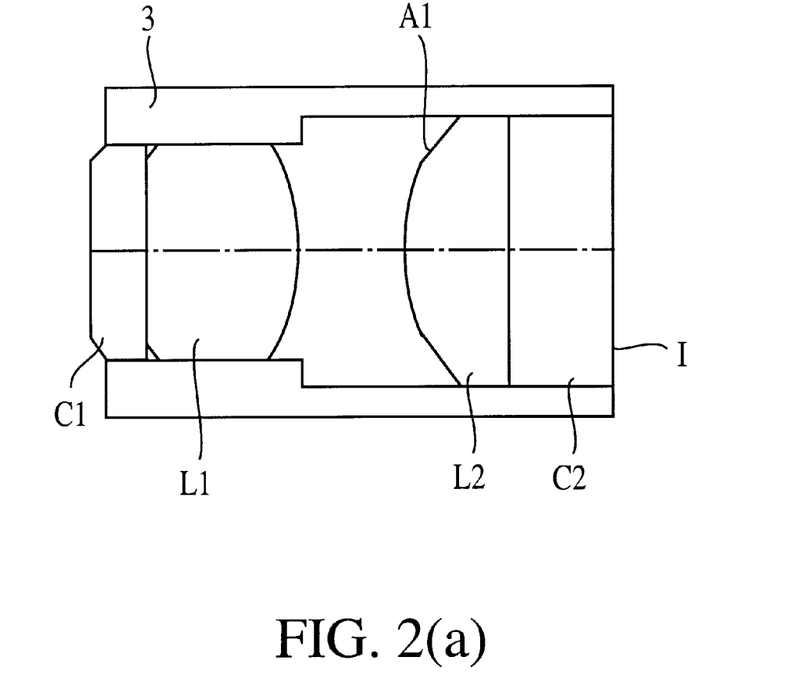
FIG. 2(a) is a side, sectional view of a second embodiment of the invention.
Figure 2B:
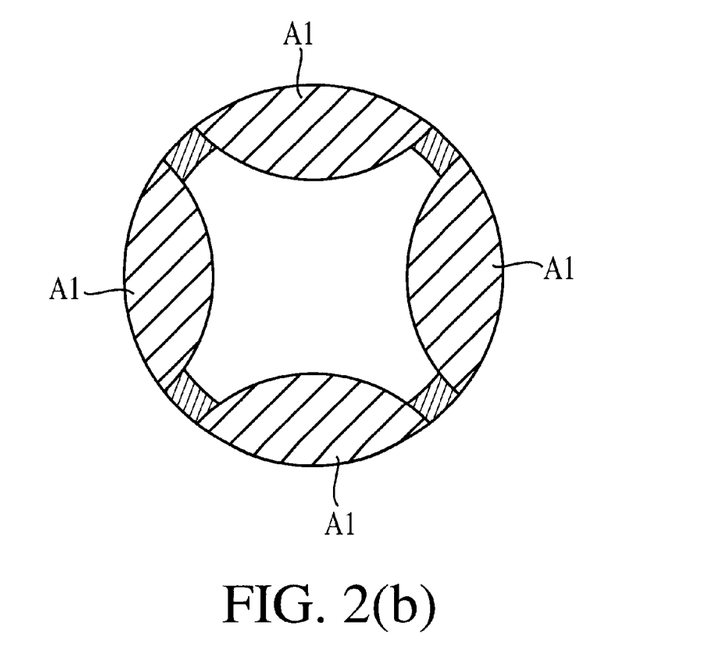
FIG. 2(b) is a different sectional view of the second embodiment of the invention, in the case where a square detector is used that eats into the optical surface of lens L2 from four sides.

FIG. 2(a) illustrates a second embodiment of the invention. The lens of this embodiment includes a first cover glass C1, a first lens element L1 of positive power, a second lens element L2 of positive power, and a charge-coupled device (hereinafter CCD) cover glass C2. These optical members are inserted in a single frame 3 having one end bored to a larger diameter than the other end. In this embodiment, a square image pick-up surface of an image pick-up element (not shown) is used. As shown in FIG. 2(b), four sloped surfaces A1 (which correspond to segments of the annular ring A1 illustrated in FIG. 1(b)) are visible and a light shield is provided on each of these sloped surfaces.

The outer diameter $\Phi 1$ of the second lens element L2 of this embodiment is 1.2 mm, and the diameter $\Phi 2$ the part except for the slope (i.e., the maximum clear aperture) is 0.84 mm. Further, $\Phi 2/\Phi 1$ equals 0.7. Moreover, the air equivalent path length D from the on-axis position of the second lens element L2 to the image plane I is 0.466 mm. The focal distance of the lens is 0.66 mm Therefore, D/f is 0.71.

Table 2 lists the surface # in order from the object side, the radius of curvature R (in mm) of each surface, the on-axis surface spacing d (in mm) of each surface, as well as the index of refraction $N_d$ and the Abbe constant $V_d$ (for the d-line) of each optical member of Embodiment 2. In the bottom portion of the table are listed some of the performance values of the lens of this embodiment.

TABLE 2

| # | R | d | $N_d$ | $V_d$ |
|---|---|---|---|---|
| 1 | ∞ | 0.2000 | 1.51633 | 64.15 |
| 2 | ∞ | 0.6100 | 1.88300 | 40.76 |
| 3 | −0.8170 | 0.4100 | | |
| 4 | 1.1310 | 0.3800 | 1.88300 | 40.76 |
| 5 | ∞ | 0.4000 | 1.51633 | 64.15 |
| 6 | ∞ | | | |
| $F_{NO}$ = 5.5 | Image height = 0.45 | f = 0.66 | D = 0.466 | |
| D/f = 0.71 | | | | |

Embodiment 3

Figure 3:
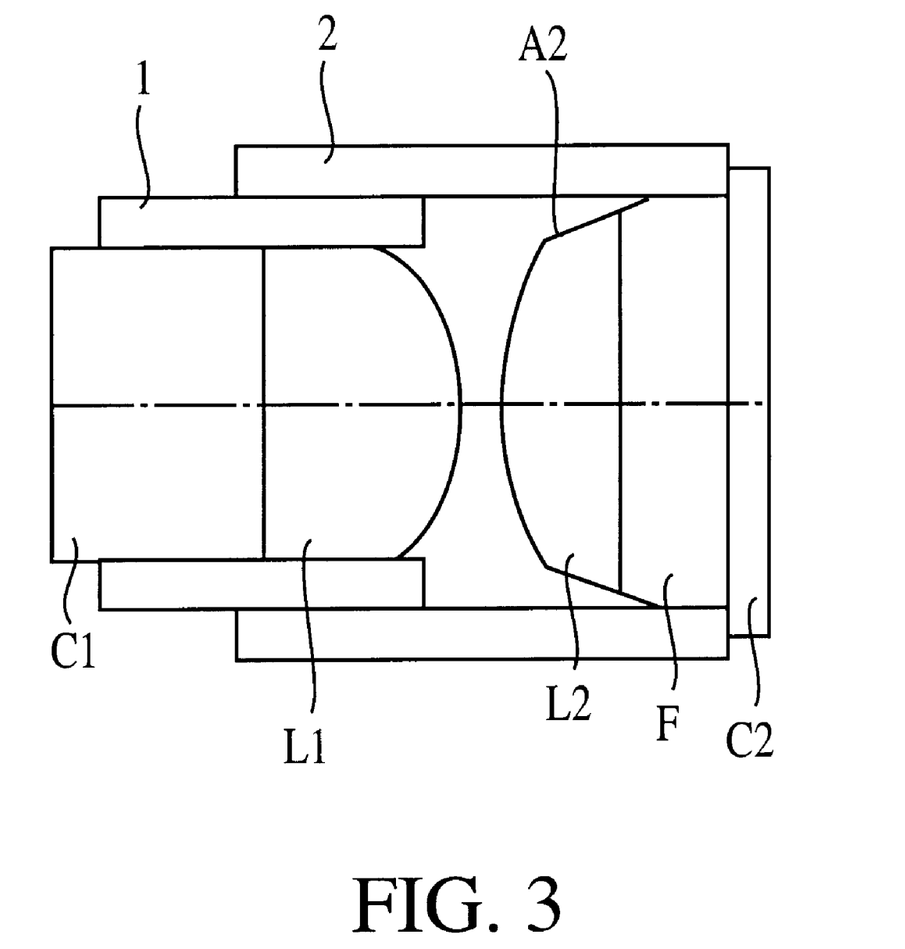
FIG. 3 is a side, sectional view of a third embodiment of the invention.

FIG. 3 illustrates a third embodiment of the lens of the present invention. In this embodiment the lens includes a cover glass C1, a first lens element L1 of positive power, a second lens element L2 of positive power, an infrared cut-off filter F, and a CCD cover glass C2. The cover glass C1 and the first lens L1 of positive power are held by the first frame 1. The second positive lens element L2 and the infrared cut-off-filter F are joined and held by the second frame 2, and C2 is the CCD cover glass.

In this third embodiment, the second positive lens element L2 and the infrared cut-off filter F are joined to form an integrated part. A slope A2 is provided on the object side of this optical member, and a light shading means, which may be formed of a light absorbing substance or film, is provided on the slope A2. Therefore, the second lens element L2 does not provide a side for attaching to a support frame 2. However, if the integrated optical member provides the side, installation is not affected.

In this third embodiment, the outer diameter $\Phi 1$ of the optical member is 2.85 mm, and the maximum clear aperture diameter $\Phi 2$ is 2.28 mm. Therefore, the ratio of $\Phi 2/\Phi 1$ is 0.8. Moreover, the air path equivalent length from the on-axis convex surface with the slope to the image surface is 1.173 mm. The focal-distance of the lens is 1.239 mm. Therefore, the ratio D/f is 0.95.

Table 3 fists the surface # in order from the object side, the radius of curvature R (in mm) of each surface, the on-axis surface spacing d (in mm) of each surface, as well as the index of refraction $N_d$ and the Abbe constant $V_d$ (for the d-line) of each optical member of Embodiment 3. In the bottom portion of the table are listed some of the performance values of the lens of this embodiment.

TABLE 3

| # | R | d | $N_d$ | $V_d$ |
|---|---|---|---|---|
| 1 | ∞ | 1.5000 | 1.88300 | 40.76 |
| 2 | ∞ | 1.3875 | 1.88300 | 40.76 |
| 3 | −1.5367 | 0.3750 | | |
| 4 | 2.5485 | 0.8325 | 1.75500 | 52.32 |
| 5 | ∞ | 0.7500 | 1.49400 | 75.00 |
| 6 | ∞ | 0.3000 | 1.52287 | 59.89 |
| $F_{NO}$ = 6.9 | Image height = 1.23 | f = 1.239 | D = 1.173 | |
| D/f = 0.95 | | | | |

Embodiment 4

Figure 4:
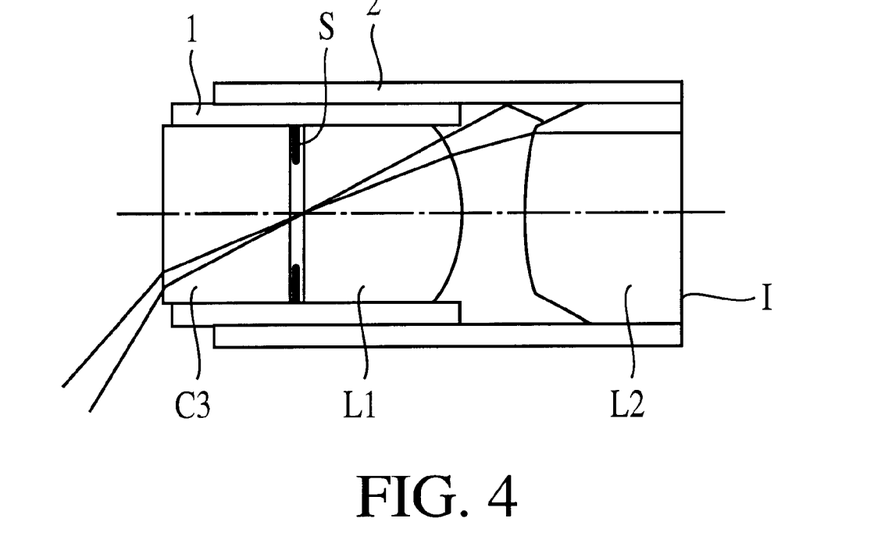
FIG. 4 is a sectional view of a fourth embodiment of the invention.

FIG. 4 illustrates a fourth embodiment of the lens of the present invention. This embodiment of the invention is an improvement over the conventional optical system shown in FIG. 9. The lens of FIG. 4 includes a cover glass C3, an aperture stop S, a first lens element L1 of positive power, and a second lens element L2 of positive power. The cover glass C3, the aperture stop S, and the first lens element L1 of positive power are held by the first frame 1. The second lens element L2 of positive power as well as the first frame 1 are held by the second frame 2.

In this embodiment, a slope is formed on the circumference part of the surface on the object side of the second lens element L2 of positive power, without employing a flare stop as in the prior art. Black paint or black ink is applied at this slope so as to form a light blocking region or shade.

The outer diameter $\Phi 1$ of the second lens element L2 of this embodiment is 0.5 mm, and the maximum clear aperture diameter $\Phi 2$ is 0.4 mm. Therefore, $\Phi 2/\Phi 1=0.8$. The air path equivalent length D from the object side of the positive lens element L2 to the image surface at I is 0.214 mm. The focal distance of the lens is 0.32 mm. Therefore, the ratio D/f is 0.67.

Table 4 lists the surface # in order from the object side, the radius of curvature R (in mm) of each surface, the on-axis surface spacing d (in mm) of each surface, as well as the index of refraction $N_d$ and the Abbe constant $V_d$ (for the d-line) of each optical member of Embodiment 4. In the bottom portion of the table are listed some of the performance values of the lens of this embodiment.

TABLE 4

| # | R | d | $N_d$ | $V_d$ |
|---|---|---|---|---|
| 1 | ∞ | 0.30 | 1.88300 | 40.8 |
| 2 | ∞ | 0.03 | | |
| 3 | ∞ | 0.37 | 1.88300 | 40.8 |
| 4 | −0.346 | 0.15 | | |
| 5 | 0.725 | 0.37 | 1.72916 | 54.7 |
| 6 | ∞ | | | |
| $F_{NO}$ = 1.75 | Image height = 0.24 | f = 0.32 | D = 0.214 | |
| D/f = 0.67 | | | | |

Embodiment 5

Figure 5:
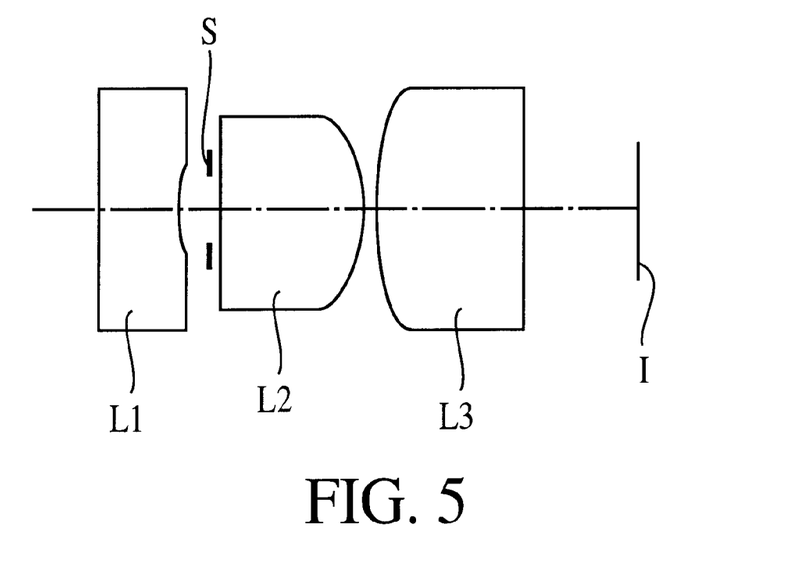
FIG. 5 is a sectional view of a fifth embodiment of the invention, less the support structure for the optical elements.

FIG. 5 illustrates a fifth embodiment of the lens of the present invention, which applies the invention to the prior art example shown in FIG. 10. That is, the lens is formed of, in order from the object side: a negative lens element L1, a diaphragm S, a first lens element L2 of positive power and a second lens element L3 of positive power. A slope is provided on the object-side surface of the second lens element L3, and a light shield is again provided in this slope.

For this embodiment, the outer diameter Φ1 of the second positive lens element L3 is 1 mm The maximum clear aperture diameter Φ2 of this lens element is 0.85 mm. Therefore, Φ2/Φ1=0.85. The air path equivalent length D from the optical member with the flare stop to the image surface I is 0.798 mm. Further, the focal distance f of the lens is 0.52 mm Therefore, D/f=1.53.

Table 5 lists the surface # in order from the object side, the radius of curvature R (in mm) of each surface, the on-axis surface spacing d (in mm) of each surface, as well as the index of refraction $N_d$ and the Abbe constant $V_d$ (for the d-line) of each optical member of Embodiment 5. In the bottom portion of the table are listed some of the performance values of the lens of this embodiment.

TABLE 5

| # | R | d | $N_d$ | $V_d$ |
|---|---|---|---|---|
| 1 | ∞ | 0.32 | 1.51633 | 64.1 |
| 2 | 0.817 | 0.13 | | |
| 3 | ∞ (aperture stop) | 0.03 | 1.88300 | 40.8 |
| 4 | −1.454 | 0.58 | 1.88300 | 40.8 |
| 5 | −0.538 | 0.06 | | |
| 6 | 1.653 | 0.58 | 1.88300 | 40.8 |
| 7 | ∞ | | | |

$F_{NO}$ = 2.2   Image height = 0.45   f = 0.52   D = 0.798
D/f = 1.53

Embodiment 6

Figure 6:
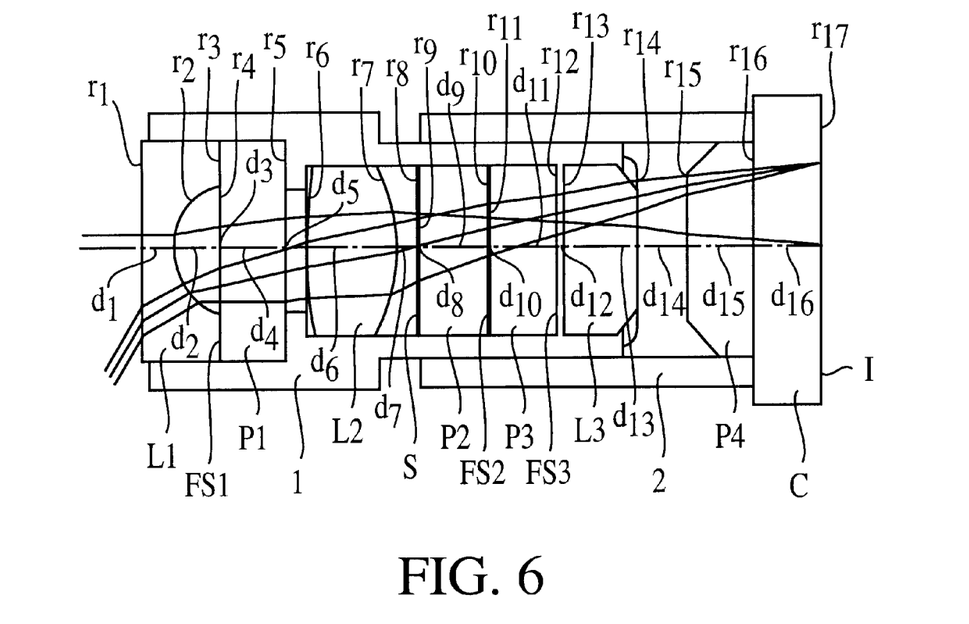
FIG. 6 is a sectional view of a sixth embodiment of the invention.

FIG. 6 shows the lens element structure of the sixth embodiment of the present invention. In this embodiment, the lens is formed of a first lens element L1 that is a plano-concave lens, a plane-parallel plate P1, a second lens element L2 that is a biconvex lens, two plane-parallel plates P2 and P3, a third lens element L3 that is a piano-convex lens, a plane-parallel plate P4, and CCD cover glass C. The image-side surface of plane-parallel plate P4 is attached to the CCD cover glass C and bonded within the frame 2 to form the CCD sub-assembly. A frame I supports lens element L1 and plane parallel plate P1, which are inserted into the object-side end of the frame 1, which has a larger bore at the object side end The frame 1 also supports the second lens element L2, the plane parallel plates P2, P3 as well as the third lens element L3 at the image side of the frame 1, within the smaller bore. The optical members illustrated in FIG. 6 that are held by the frame 1 are bonded thereto after being inserted in the appropriate end of frame 1 so as to form another sub-assembly. These two sub-assemblies can be attached to one another as illustrated and bonded to form the lens.

The light-rays near the CCD sub-assembly are located far from the optical axis. Therefore, flare is easily generated in this vicinity, and accordingly it is necessary to remove flare near the CCD subassembly. Thus, the present invention can be applied in this vicinity to reduce flare. Moreover, if the plane-parallel plate P4 is provided with a slope (as illustrated) near its circumferential edge, any flare resulting from off-field rays being reflected by the inside surface of the frame 2 can be removed. If a slope is provided on an attached cover glass or on a lens element flare generated by off-field rays being reflected by the circumferential edge of these elements or the inside surface of the frame 1 can be removed As illustrated, a flare stop FS1 is arranged on the object side of a plane-parallel plate P1. Aperture stop S is arranged on the object side of plane-parallel plate P2. A flare stop FS2 is arranged between the two plane-parallel plates P2 and P3, and a flare stop FS3 is arranged between plane-parallel plate P3 and the third lens element L3.

For this sixth embodiment, a slope is provided at the image-side surface of the third lens element L3, i.e., on the surface supported by frame 1 nearest the image-side. A shading means, such as a light absorbing substance, is provided on this slope. In addition, a slope is also provided on the object-side surface of plate P4, and a shading means, such as a light absorbing substance, is also provided on this slope. Thus, the present invention is advantageous if a flare stop is to be provided at a location where, using a conventional flare stop formed of an annular diaphragm, it would be difficult to locate the support for the annular diaphragm. Thus the present invention is especially suitable at locations, such as the image-side end of frame 1, where it would be especially difficult to hold a conventional flare stop.

The outer diameter Φ1 of the third lens element L3, which is the optical member with the slope in this embodiment, is 1 mm. The maximum clear aperture diameter Φ2 (except for the slope) of this optical member is 0.9 mm. Therefore, Φ2/Φ1=0.9. Moreover, the air path equivalent length D from the image side of the third lens element L3 to the image plane I (i.e., measured on-axis from surface #14 to surface #17) is 0.819. The focal distance f of the lens is 0.573 mm; thus, the ratio D/f is 1.43. Moreover, the angle θ1 of the slope provided at the image side of the third lens element L3 is 40 degrees.

When the third lens element L3 is inserted into the frame 1, the third lens element L3 is fixed by applying an adhesive to which India ink has been added and mixed-in. The adhesive is applied not only to the circumference edge of the third lens element L3, but is also applied to the slope. In this way the adhesive serves as the shading means on the slope. The other optical member having a slope provided for flare reduction is plane parellel plate P4. The outer diameter Φ1 of plane-parallel plate P4 in this embodiment is 1.3 mm, and the maximum clear aperture diameter Φ2 is 1 mm Therefore, the ratio Φ2/Φ1 is 0.77. Moreover, the air path equivalent length D from object side surface of plane-parallel plate P4 to the image surface I (measured from surface #15 to surface #17) is 0.529 mm. Thus, D/f is 0.92. The angle of the slope θ1 on this optical member is 60 degrees.

Table 6 lists the surface # in order from the object side, the radius of curvature R (in mm) of each surface, the on-axis surface spacing d (in mm) of each surface, as well as the index of refraction $N_d$ and the Abbe constant $V_d$ (for the d-fine) of each optical member of Embodiment 6. In the bottom portion of the table are listed some of the performance values of the lens of this embodiment.

TABLE 6

| # | R | d | $N_d$ | $V_d$ |
|---|---|---|---|---|
| 1 | ∞ | 0.2000 | 1.88300 | 40.76 |
| 2 | 0.4270 | 0.2400 | | |
| 3 | ∞ (flare stop) | 0.0300 | | |
| 4 | ∞ | 0.4000 | 1.52287 | 59.89 |
| 5 | ∞ | 0.1000 | | |
| 6 | 2.4060 | 0.57 | 1.90135 | 31.55 |
| 7 | −0.9770 | 0.1100 | | |
| 8 | ∞ (aperture stop) | 0.0300 | | |
| 9 | ∞ | 0.4000 | 1.51400 | 75.00 |

TABLE 6-continued

| # | R | d | $N_d$ | $V_d$ |
|---|---|---|---|---|
| 10 | ∞ (flare stop) | 0.0300 | | |
| 11 | ∞ | 0.4000 | 1.52287 | 59.89 |
| 12 | ∞ (flare stop) | 0.0300 | | |
| 13 | ∞ | 0.4500 | 1.88300 | 40.76 |
| 14 | −2.6340 | 0.2900 | | |
| 15 | ∞ | 0.4000 | 1.51633 | 64.15 |
| 16 | ∞ | 0.4000 | 1.51100 | 64.14 |
| 17 | ∞ | | | |

$F_{NO} = 3.6$  Image height = 0.5  f = 0.573
For L3: D = 0.819  D/f = 1.43
For P4: D = 0.529  D/f = 0.92

Embodiment 7

Figure 7:
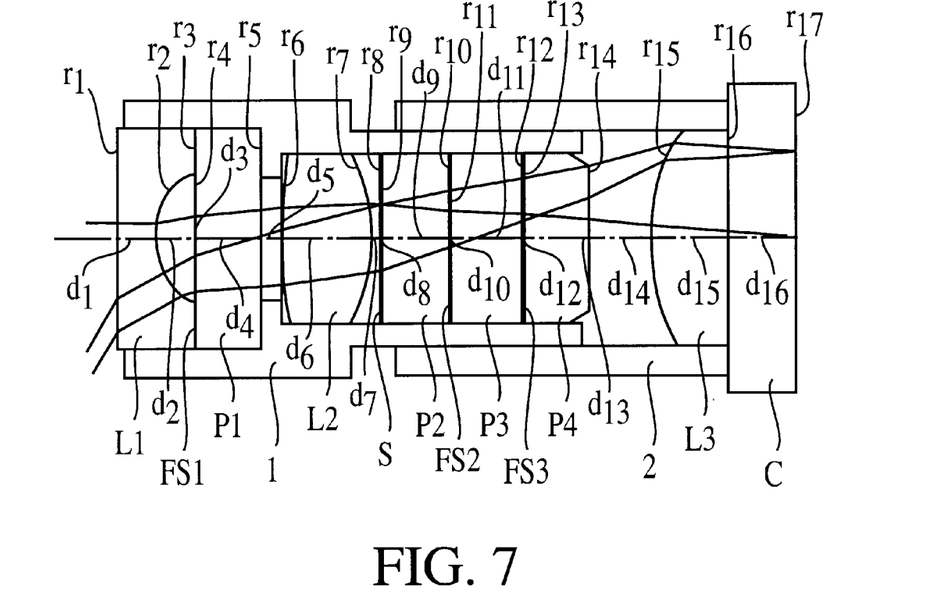
FIG. 7 is a sectional view of a seventh embodiment of the invention.

FIG. 7 illustrates the seventh embodiment of the invention. The lens of this embodiment includes a first lens element L1 formed of a piano-concave lens with its concave surface on the image side, a plane-parallel plate P1, a second lens element L2 that is biconvex, three plane-parallel plates P2–P4, a third lens element L3 formed of a piano-convex lens with its convex surface on the object side, and a CCD cover plate C. The third lens element L3 and the CCD cover glass C are attached to one another. And, the third lens element L3, the CCD cover glass C and the CCD array are integrated to form a CCD sub-assembly. An aperture stop S is arranged at the object-side surface of plane-parallel plate P2, a flare stop FSI is arranges at the object-side of plane-parallel plate P1, and flare stops FS2 and FS3 are arranged and pressed between plane-parallel plates P2–P3 and between plates P3–P4, respectively.

In this embodiment, the flare-reducing slope is formed on the image-side surface of the plane-parallel plate P4, which is the optical member at the image-side of frame 1. The outer diameter Φ1 of plane-parallel plate P4 is 1 mm The maximum clear aperture diameter Φ2 is 0.9 mm. Therefore, Φ2/Φ1 is 0.9. The air path equivalent length D from the optical element to the image plane (measured on-axis from surface #14 to #17) is 0.879 mm. The focal-distance of the lens is 0.564 mm. Therefore, D/f=1.56. In addition, flare reduction can be maximized if a slope is also provided on the object side of the third lens element L3. Moreover, the inclination angle of the slope at the image side of plane-parallel plate P4 in this embodiment is 50 degrees.

Table 7 lists the surface # in order from the object side, the radius of curvature R (in mm) of each surface, the on-axis surface spacing d (in mm) of each surface, as well as the index of refraction $N_d$ and the Abbe constant $V_d$ (for the d-line) of each optical member of Embodiment 7. In the bottom portion of the table are listed some of the performance values of the lens of this embodiment.

TABLE 7

| # | R | d | $N_d$ | $V_d$ |
|---|---|---|---|---|
| 1 | ∞ | 0.2000 | 1.88300 | 40.76 |
| 2 | 0.4620 | 0.2100 | | |
| 3 | ∞ (flare stop) | 0.0300 | | |
| 4 | ∞ | 0.4000 | 1.51633 | 64.14 |
| 5 | ∞ | 0.0900 | | |
| 6 | 2.0490 | 0.5700 | 1.90135 | 31.55 |
| 7 | −1.0090 | 0.0200 | | |
| 8 | ∞ (aperture stop.) | 0.0300 | | |
| 9 | ∞ | 0.4000 | 1.52287 | 59.89 |
| 10 | ∞ (flare stop) | 0.0300 | | |
| 11 | ∞ | 0.4000 | 1.52287 | 59.89 |
| 12 | ∞ (flare stop) | 0.0300 | | |
| 13 | ∞ | 0.4000 | 1.51400 | 75.00 |
| 14 | ∞ | 0.3700 | | |
| 15 | 1.3920 | 0.4600 | 1.88300 | 40.76 |
| 16 | ∞ | 0.4000 | 1.51100 | 64.10 |
| 17 | ∞ | | | |

$F_{NO} = 3.5$  Image height = 0.5  f = 0.564  D = 0.879
D/f = 1.56

Embodiment 8

FIG. 8(a) illustrates an eighth embodiment of the lens of the present invention. Embodiment 8 includes, in order from the object side, a field transforming optical element Pr, a first lens element L1 of positive power, aperture stop S, a plane-parallel cover glass P1 held in a frame 1, a plane-parallel cover glass P2, a second lens element L2 of positive power, a plane-parallel absorption-type infrared blocking filter P3 and a CCD cover glass C held in a frame 2.

This embodiment has a structure wherein the front and back of an optical system can be separated between the two plane-parallel cover glasses P1 and P2. An adapter unit is placed before the plane-parallel cover glass P1 and a master unit is placed after the plane-parallel cover glass P2. The adapter unit may be selected in accordance with the intended purposes.

The marginal section of a surface of the positive lens element L2 on the image side is fixed to the frame 2 with adhesives A. The adhesives contain a black, light-absorbing material such as carbon so as to form a light shield. In this embodiment, in lieu of there being an inclined section at the marginal periphery of the positive lens element L2, the inclination angle of the lens surface itself at the periphery is made large, so that a groove 4 (FIG. 8(b)) is formed between the optical surface and the frame. The light blocking adhesive is then applied to this slot.

The positive lens element L2 of this embodiment is arranged nearest the image side among those lens elements of the lens having curvature. It is preferable to provide light shielding at the lens element arranged closest to the image side. This is because, as the position of the lens element approaches the image side of the lens, the ray height of a principal ray gets larger (i.e, the ray is farther from the optical axis) and thus it is more likely that flare is generated.

In this embodiment, the outer diameter Φ1 of the second positive lens element L2 is 1.4 mm and the radius of curvature R ofthe optical surface on the image side is −1.2362. Thus the right side of Condition (6) is 0.57. The air path equivalent length (D) from the on-axis position of the image side of positive lens element L2 to the image plane I is 1.34 mm and the focal length ofthe lens is 1.98 mm. Therefore, the ratio D/f equals 0.68.

FIG. 8(b) is an expanded view of the lens element L2 shown in FIG. 8(a). When the angle a between the normal line at the marginal section of an optical surface and the optical axis is larger than 20°, the groove 4 is formed between the optical surface and a frame, so that it will be easy to apply an adhesive to the marginal section without need for forming a separate annular inclined surface near the circumferential edge of the lens, as done for the previous embodiments. Condition (4) is specifies that the angle α exceeds 20°, and the constant 0.34 on the right side of this condition represents the value of sin 20°. In this embodiment, the adhesive is mixed with a black light absorbing material, such as carbon.

Moreover, in forming a light shield using adhesive mixtures while fixing a lens element to a frame, it is preferable to form the light shield on the lens element, among those lens elements having curvature, that is arranged in the objective portion of the lens nearest the image side. This is because the ray height (i.e., distance from the optical axis) becomes higher as the lens element position approaches the image side, and thus flare is more likely to occur. Furthermore, in forming a light shield using an adhesive mixture while fixing a lens to a frame, it is preferable to satisfy Condition (3) even when Condition (6) is satisfied and an inclined section is not separately formed at the marginal section of an optical surface.

Table 8 lists the surface # in order from the object side, the radius of curvature R (in mm) of each surface, the on-axis surface spacing d (in mm) of each surface, as well as the index of refraction $N_d$ and the Abbe constant $V_d$ (for the d-line) of each optical member of Embodiment 8. In the bottom portion of the table are listed some of the performance values of the lens of this embodiment.

TABLE 8

| # | R | d | $N_d$ | $V_d$ |
|---|---|---|---|---|
| 1 | ∞ | 1.0000 | 1.88300 | 40.76 |
| 2 | ∞ | 1.0000 | 1.88300 | 40.76 |
| 3 | ∞ | 0.0500 | | |
| 4 | 1.5896 | 1.2382 | 1.88300 | 40.76 |
| 5 | 1.3113 | 0.0492 | | |
| 6 | ∞ (aperture stop) | 0.0300 | | |
| 7 | ∞ | 0.3500 | 1.51633 | 40.76 |
| 8 | ∞ | 0.0500 | | |
| 9 | ∞ | 0.3500 | 1.51633 | 64.14 |
| 10 | ∞ | 0.0300 | | |
| 11 | ∞ | 0.3974 | 1.88300 | 64.14 |
| 12 | −1.2362 | 0.4069 | | |
| 13 | ∞ | 1.0000 | 1.49400 | 75.00 |
| 14 | ∞ | 0.4000 | 1.51633 | 64.14 |
| 15 | ∞ | 0.0000 | | |

$F_{NO}$ = 4.7   Image height = 0.9   f = 1.98   D = 1.34
D/f = 0.68

The invention being thus described, it will be obvious that the same may be varied in many ways. For example, the light shield could be modified to be reflective, since the flare rays would in most instances be reflected to an absorbing surface and thereby be greatly attenuated. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. In a lens in which an optical member having an optical axis is inserted inside and held by a holding member, the improvement of:
   the optical member having a sloped surface that is non-parallel to the optical axis and a circumferential edge, said sloped surface being immediately adjacent the circumferential edge, the circumferential edge being supported by said holding member; and
   a light absorbing or light attenuating substance on said sloped surface, so that off-axis light rays from outside the designed angle of view of said lens which strike an inside surface of the holding member or the circumferential edge of the optical member are intercepted by the sloped surface and absorbed or attenuated, thereby reducing flare in an image plane of said lens.

2. The lens of claim 1, wherein said sloped surface is either planar or convex.

3. The lens of claim 1, wherein the diameter of the lens is 3 mm or less.

4. In a lens in which an optical member is inserted inside and held by a holding member, the improvement of:
   the optical member having a sloped surface outside the circumference of a maximum clear aperture portion of said optical member; and
   a light absorbing or light attenuating substance on said sloped surface, so that off-axis light rays from outside the designed angle of view of said lens which strike an inside surface of the holding member or the circumferential edge of an optical member held by the holding member may be intercepted by the sloped surface and absorbed or attenuated, thereby reducing flare in an image plane of said lens, said lens further satisfying the following conditions:

Φ1<3 mm 0.6<Φ2/Φ1<0.95 where

Φ1 is the outer diameter of an optical member, and
   Φ2 is the diameter of the maximum clear aperture portion of said optical member.

5. A lens having an optical axis and comprising, in order from the object side:
   an aperture stop;
   a first lens element of positive power with a convex surface on the image side;
   a second lens element of positive power with a convex surface on the object side; and
   a holding member;
   wherein
      the second lens element is inserted into and is held by the holding member;
      the second lens element has a sloped surface that is non-parallel to the optical axis and a circumferential edge, said sloped surface being immediately adjacent the circumferential edge, the circumferential edge being supported by said holding member; and
      the sloped surface has a light absorbing or light attenuating substance applied thereto,
   whereby
      off-axis light rays from outside the designed angle of view of said lens and which strike an inside surface of the holding member or the circumferential edge of an optical member held by the holding member are intercepted by the sloped surface and absorbed or attenuated, thereby reducing flare in an image plane of said lens.

6. The lens of claim 5, wherein the diameter of the lens is 3 mm or less.

7. In a lens wherein an optical member is inserted within and held by a holding member, the improvement of:
   the optical member having a sloped surface at the circumference edge of an optical face, and
   a light absorbing or light attenuating substance provided on the slope surface;

wherein
the on-axis position of the optical face which includes the sloped surface satisfies the following condition 0.5<D/f<2 where
D is the air path equivalent length from the on-axis position of the optical face which includes the sloped surface to the image plane of said lens, and
f is the focal length of said lens.

8. The lens of claim 7, said lens further satisfying the following condition:

0.6<Φ2/Φ1 <0.95 where
Φ1 is the outer diameter of the optical member, and
Φ2 is the diameter of the optical member excluding the sloped surface.

9. The lens of claim 7, said lens further comprising, in order from the object side:
an aperture stop;
a first lens element of positive power with a convex surface on the image side;
a second lens element of positive power with a convex surface on the object side; and
a holding member;
wherein
the second lens element is inserted into and is held by the holding member;
the second lens element has a sloped surface outside the circumference of a clear aperture portion of the second lens element; and
the sloped surface has a light absorbing or light attenuating substance applied thereto,
whereby
off-axis light rays from outside the designed angle of view of said lens and which strike an inside surface of the holding member or the circumferential edge of an optical member held by the holding member may be intercepted by the sloped surface and absorbed or attenuated, thereby reducing flare in an image plane of said lens.

10. In a lens in which an optical member is inserted inside and held by a holding member, the improvement of:
the optical member having a sloped surface outside the circumference of a maximum clear aperture portion of said optical member said sloped surface being either planar or convex; and
a light absorbing or light attenuating substance on said sloped surface, so that off-axis light rays from outside the designed angle of view of said lens which strike an inside surface of the holding member or the circumferential edge of an optical member held by the holding member may be intercepted by the sloped surface and absorbed or attenuated, thereby reducing flare in an image plane of said lens, said lens further satisfying the following conditions:

Φ1<3 mm 0.6<Φ2/Φ1<0.95 where
Φ1 is the outer diameter of the optical member, and
Φ2 is the diameter of the optical member excluding the sloped surface.

11. In a lens in which a sub-assembly is inserted within and held by a first holding member and the sub-assembly is formed of a plurality of optical members that are combined and held by a second holding member, the improvement of:
among the optical members that are held by at least one holding member, the optical member nearest the image side having a circumferential edge and an inclined surface, the inclined surface being immediately adjacent the circumferential edge of the optical member, the circumferential edge being supported by said holding member; and
the inclined surface including a light attenuating or light absorbing substance,
whereby
off-field light, which passes through an optical surface and is reflected at an inner surface of a holding member or at a circumferential edge of an optical member, is incident on the inclined surface.

12. The lens of claim 11, said inclined surface being either planar or convex.

13. The lens of claim 11, said lens further comprising, in order from the object side:
an aperture stop;
a first lens element of positive power with a convex surface on the image side;
a second lens element of positive power with a convex surface on the object side; and
a holding member;
wherein
the second lens element is inserted within and held by the holding member, said second lens element including an inclined surface at a marginal section of its object-side surface, said inclined surface including a light absorbing or light attenuating substance.

14. The lens of claim 11, wherein the diameter of the lens is 3 mm or less.

15. In a lens in which a sub-assembly is inserted within and held by a first holding member and the sub-assembly is formed of a plurality of optical members that are combined and held by a second holding member, the improvement of:
among the optical members that are held by at least one holding member, the optical member nearest the image side having an inclined surface outside a clear aperture of an optical surface; and
the inclined surface including a light attenuating or light absorbing substance,
whereby
off-field light which passes through an optical surface and is reflected at an inner surface of a holding member or at a periphery edge of an optical member, is incident on the inclined surface;
said lens further satisfying the following conditions:

Φ1<3 mm 0.6<Φ2/Φ1<0.95 where
Φ1 is the outer diameter of the optical member, and
Φ2 is the diameter of the optical member excluding the sloped surface.

16. In a lens in which a sub-assembly is inserted within and held by a first holding member and the sub-assembly is formed of a plurality of optical members that are combined and held by a second holding member, the improvement of:

among the optical members that are held by at least one holding member, the optical member nearest the image side having an inclined surface outside a clear aperture of an optical surface; and the inclined surface being either planar or convex and including a light attenuating or light absorbing substance, whereby off-field light which passes through an optical surface and is reflected at an inner surface of a holding member or at a periphery edge of an optical member, is incident on the inclined surface;

said lens further satisfying the following conditions:

$$\Phi 1 < 3 \text{ mm}$$

$$0.6 < \Phi 2/\Phi 1 < 0.95$$

where $\Phi 1$ is the outer diameter of the optical member, and $\Phi 2$ is the diameter of the optical member excluding the sloped surface.

17. In a lens having an optical axis in which a sub-assembly is inserted within and held by a holding member and the sub-assembly includes optical members that are held by a first frame, the improvement of:

at least one of said optical members having an inclined surface that is non-parallel to the optical axis and a circumferential edge, said inclined surface begin a immediately adjacent the circumferential edge, the circumferential edge being supported by said holding member, said inclined surface having an adhesive applied thereto which includes a light absorbing or light attenuating substance.

18. The lens of claim 17, wherein the diameter of the lens is 3 mm or less.

19. In a lens in which a sub-assembly is inserted within and held by a holding member and the sub-assembly includes optical members that are held by a first frame, the improvement of:

at least one of said optical members having an inclined surface at a marginal section, said inclined surface having an adhesive applied thereto which includes a light absorbing or light attenuating substance;

wherein the optical member having an inclined surface is one of:

a CCD cover glass, an optical member that is positioned directly in front of a CCD cover glass, or an optical member directly in front of a CCD unit.

20. In a lens in which a sub-assembly is inserted within and held by a first holding member, said sub-assembly including one or more optical members being held by a second holding member, the improvements comprising:

an optical member having a light absorbing or light attenuating substance on an optical surface that is outside a clear aperture of said optical member;

the light absorbing or light attenuating substance being mixed with an adhesive to form an adhesive mixture, said optical member being fixed by said adhesive mixture to a holding member and applied in a groove near the outer circumference of the optical member, said groove being formed by the optical member satisfying the following condition $$\Phi 1/(2 \times |R|) > 0.34$$

where $\Phi 1$ is the outer diameter of the optical member to which the adhesive mixture is applied, and R is the radius of curvature of the optical surface on which the adhesive mixture is applied.

21. The lens of claim 20, wherein the optical member on which the adhesive mixture is applied is the lens element arranged closest to the image side of said lens.

22. The lens of claim 20, wherein the optical surface on which an adhesive mixture is applied is positioned axially so as to satisfy the following condition $$0.5 < D/f < 2$$

where

D is the air path equivalent length between the on-axis position of the optical surface having the adhesive mixture applied and the image surface of said lens, and f is a focal length of the lens.

* * * * *

UNITED STATES PATENT AND TRADEMARK OFFICE
CERTIFICATE OF CORRECTION

PATENT NO.    : 6,239,922 B1
DATED         : May 29, 2001
INVENTOR(S)   : Nakamura Page 1 of 1

It is certified that error appears in the above-identified patent and that said Letters Patent is hereby corrected as shown below:

Column 7,
Line 63, change "ofthe" to -- of the --;

Column 8,
Line 40, change "ofthe" to -- of the --;

Column 10,
Line 53, change "d-fine" to -- d-line --;

Column 12,
Line 56, change "ofthe" to -- of the --;

Column 15, claim 10,
Line 49, insert a comma after "optical member";

Column 17, claim 16,
Line 20, change "ofthe" to -- of the --; and

Column 17, claim 17,
Line 30, change "begin" to -- being --.

Signed and Sealed this

Fifteenth Day of January, 2002

Attest:

JAMES E. ROGAN
*Director of the United States Patent and Trademark Office*

*Attesting Officer*